(12) United States Patent
Wang

(10) Patent No.: US 8,065,885 B2
(45) Date of Patent: Nov. 29, 2011

(54) REFRIGERATION AND FREEZING DEVICE WITH FRESH-KEEPING FUNCTION BY SUPPLYING NITROGEN

(76) Inventor: Dong-lei Wang, Zhuhai (CN)

( * ) Notice: Subject to any disclaimer, the term of this patent is extended or adjusted under 35 U.S.C. 154(b) by 540 days.

(21) Appl. No.: 12/160,397

(22) PCT Filed: Jan. 11, 2007

(86) PCT No.: PCT/CN2007/000118
§ 371 (c)(1),
(2), (4) Date: Jul. 9, 2008

(87) PCT Pub. No.: WO2007/079692
PCT Pub. Date: Jul. 19, 2007

(65) Prior Publication Data
US 2010/0269525 A1     Oct. 28, 2010

(30) Foreign Application Priority Data
Jan. 11, 2006   (CN) .......................... 2006 1 0032834

(51) Int. Cl.
*F24F 3/16*     (2006.01)
(52) U.S. Cl. .................. 62/78; 62/299; 62/404
(58) Field of Classification Search ............ 62/78, 299, 62/404, 440, 441
See application file for complete search history.

(56) References Cited

U.S. PATENT DOCUMENTS

| | | | | |
|---|---|---|---|---|
| 3,937,847 A | * | 2/1976 | Elkins et al. ................ 426/231 |
| 4,454,723 A | * | 6/1984 | Weasel, Jr. ..................... 62/64 |
| 4,976,109 A | * | 12/1990 | Garrett .......................... 62/642 |
| 5,136,853 A | * | 8/1992 | Girardon et al. ................. 62/78 |
| 5,271,240 A | * | 12/1993 | Detrick et al. .................. 62/268 |
| 5,333,394 A | * | 8/1994 | Herdeman et al. .............. 34/467 |
| 6,560,974 B2 | * | 5/2003 | Kroll et al. ...................... 62/78 |
| 2009/0266095 A1 | * | 10/2009 | Pruneri .......................... 62/231 |

FOREIGN PATENT DOCUMENTS

| | | |
|---|---|---|
| CN | 1030468 | 1/1989 |
| CN | 2307457 | 2/1999 |
| CN | 1218172 | 6/1999 |
| CN | 1305084 | 7/2001 |
| JP | 9-37644 | 2/1997 |
| JP | 10-215764 | 8/1998 |

* cited by examiner

*Primary Examiner* — Marc Norman
(74) *Attorney, Agent, or Firm* — Allen, Dyer, Doppelt, Milbrath & Gilchrist, P.A.

(57) ABSTRACT

A refrigeration and freezing device with fresh-keeping function by supplying nitrogen comprises a box body, a refrigerating and freezing chamber disposed inside the box body, a door to the refrigerating and freezing chamber, a control device and a nitrogen generator; wherein said nitrogen generator is disposed either inside or outside the box body of the refrigeration and freezing device, said nitrogen generator comprises an air inlet, an oxygen outlet, a nitrogen outlet, an air filter connected with the air inlet, a compressor, a pipe device for transmitting gas, at least one carbon molecular sieve absorber, at least one control valve to control different absorbers to work alternately, a nitrogen storage container, a nitrogen purifier, a pressure reducing valve for adjusting the pressure of the produced nitrogen, a ventilating muffler disposed on a pipe to the oxygen outlet and a control circuit.

9 Claims, 4 Drawing Sheets

REFRIGERATION AND FREEZING DEVICE WITH FRESH-KEEPING FUNCTION BY SUPPLYING NITROGEN

FIELD OF THE INVENTION

The present invention relates to a refrigeration and freezing device with fresh-keeping function by supplying nitrogen, more particularly, to a refrigerator and a refrigerating cabinet with fresh-keeping function by supplying nitrogen.

BACKGROUND OF THE INVENTION

Along with the continuous society development, people have an increasing demand on the quality of food in daily life, vegetables, fruits and meat, etc should be kept in good shape but also in good color with good smell and taste. Currently, refrigerators and refrigerating cabinets are mainly used to keep food fresh, but it is not a good way, since vegetables and fruits of the leaf class will lose their original flavor and nutrition and also get crinkles and spoiled spots when they are kept cold at around zero degree. All refrigerators and refrigerating cabinets in current market as well as the lately released zero-degree fresh-keeping refrigerator have deficiencies in keeping food cold, for example, the food is very likely to get old, faded, deformed, and the fresh keeping can not be ensured in case of long time no power supply, moreover, it is difficult to deal with the oxygen contained inside the refrigerators or refrigerating cabinets which speeds up the process of food oxidation.

Nitrogen is a colourless, innoxious and odourless inert gas, and it has no chemical reactions with food and works effectively to slow down the process of food oxidation so as to keep food fresh. With the above principle that nitrogen keeps food fresh, the invention of a refrigerator and a refrigerating cabinet with fresh-keeping function by supplying nitrogen will bring people new consuming concept by providing better fresh food rich in quality and nutrition. The prior art refrigerator or refrigerating cabinet with fresh-keeping function by supplying nitrogen is only theoretically published, without any disclosure of a practical technical scheme necessary for product manufacture, neither technical solutions for incorporating a nitrogen generator into a refrigerator or refrigerating cabinet, nor technical solutions for detection and control on nitrogen content, etc.

SUMMARY OF THE INVENTION

The present invention is aimed at providing a mini Pressuring Swing Adsorption (PSA) or membrane separation nitrogen generator to be applied to refrigerators or refrigerating cabinets for domestic or commercial use, such that, by combining a refrigerator or a refrigerating cabinet with a nitrogen generator into a combined box body, the present invention is compact in structure, has double functions, costs economically and is flexible in operation.

The object of the present invention is achieved by the following technical scheme:

A refrigeration and freezing device with fresh-keeping function by supplying nitrogen comprises a box body, a refrigerating and freezing chamber disposed inside the box body, a door to the refrigerating and freezing chamber, a control device and a nitrogen generator; wherein said nitrogen generator is disposed either inside or outside the box body of the refrigeration and freezing device, said nitrogen generator comprises an air inlet, an oxygen outlet, a nitrogen outlet, an air filter connected with the air inlet, a compressor, a pipe device for transmitting gas, at least one carbon molecular sieve absorber, at least one control valve to control different absorbers to work alternately, a nitrogen storage container, a nitrogen purifier, a pressure reducing valve for adjusting the pressure of the produced nitrogen, a ventilating muffler disposed on a pipe to the oxygen outlet and a control circuit; wherein said oxygen outlet leads to the outside of said refrigeration and freezing device, said nitrogen outlet is connected with an inlet of the refrigerating and freezing chamber via a pipe, a quick-connect device which can be easily inserted and drawn is disposed between said pipe and said inlet of the refrigerating and freezing chamber; wherein a nitrogen concentration feedback device is disposed inside said refrigerating and freezing chamber, said nitrogen concentration feedback device is electrically connected with the control device so as to control the operation of the nitrogen generator; wherein said pipe device functions as a communicating passage enabling connection between parts, said control valve is disposed on the upstream of the carbon molecular sieve absorber, said nitrogen storage container and nitrogen purifier are disposed respectively on the downstream of the carbon molecular sieve absorber; and wherein said control circuit is electrically connected with the control device of the refrigeration and freezing device.

Wherein said refrigeration and freezing device embodies as a refrigerator or a refrigerating cabinet.

Wherein said nitrogen generator embodies as a molecular sieve nitrogen generator or a membrane separation nitrogen generator.

Wherein said compressor of the nitrogen generator embodies as an oil free compressor or a common compressor shared by the refrigerator or refrigerating cabinet.

The present invention has following technical effects: a refrigerator or a refrigerating cabinet is provided with nitrogen supply function, which enables direct nitrogen supply in the refrigerating and freezing chamber of the refrigerator or refrigerating cabinet so as to keep food stored and fresh in families, food stores, catering industry and public entertainment places, etc.

DETAILED DESCRIPTION OF THE PREFERRED EMBODIMENTS

Figure 1:
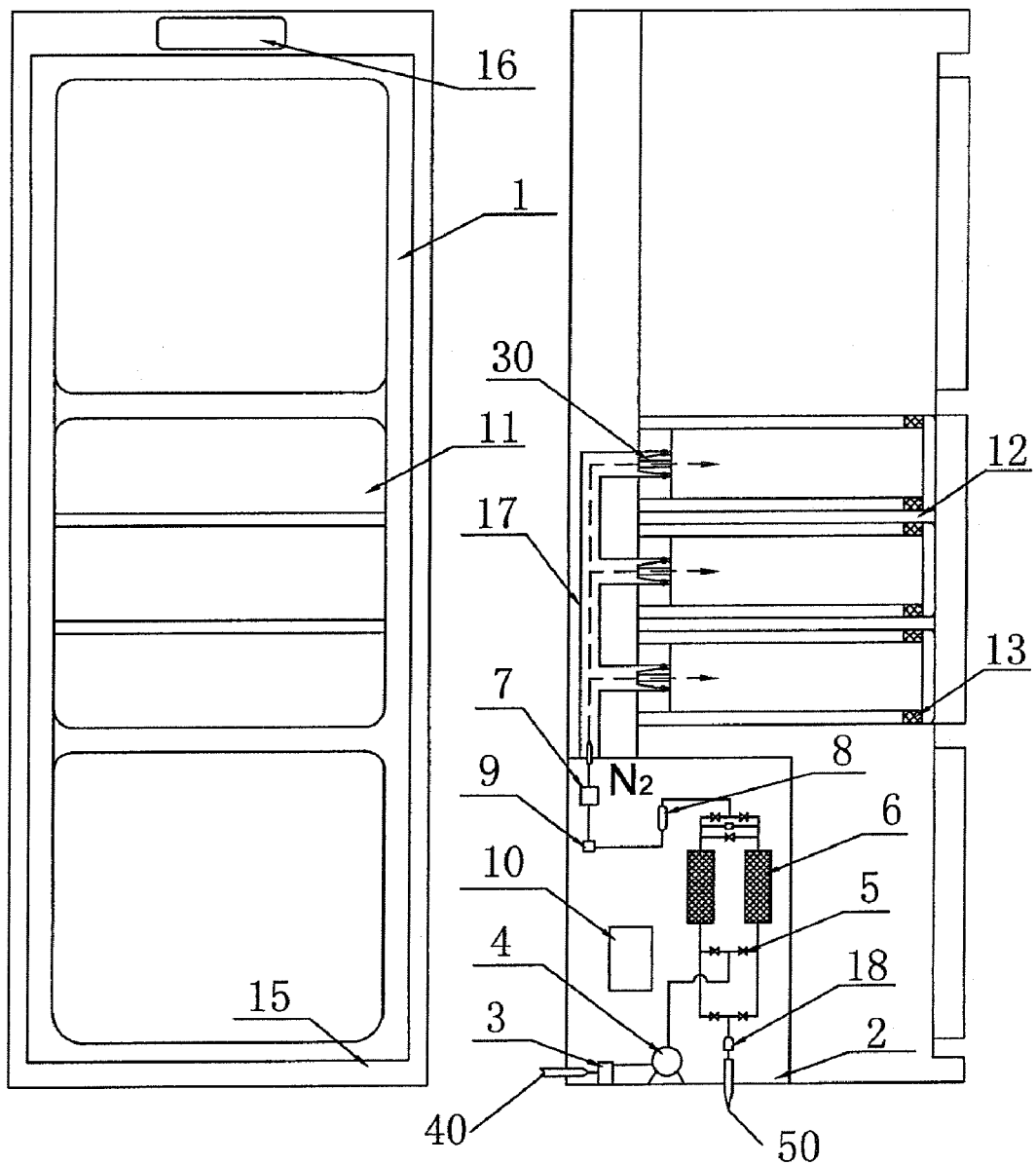
FIG. 1 is a structural view of a refrigeration and freezing device with fresh-keeping function by supplying nitrogen embodying as a refrigerator according to one embodiment of the present invention.
Figure 2:
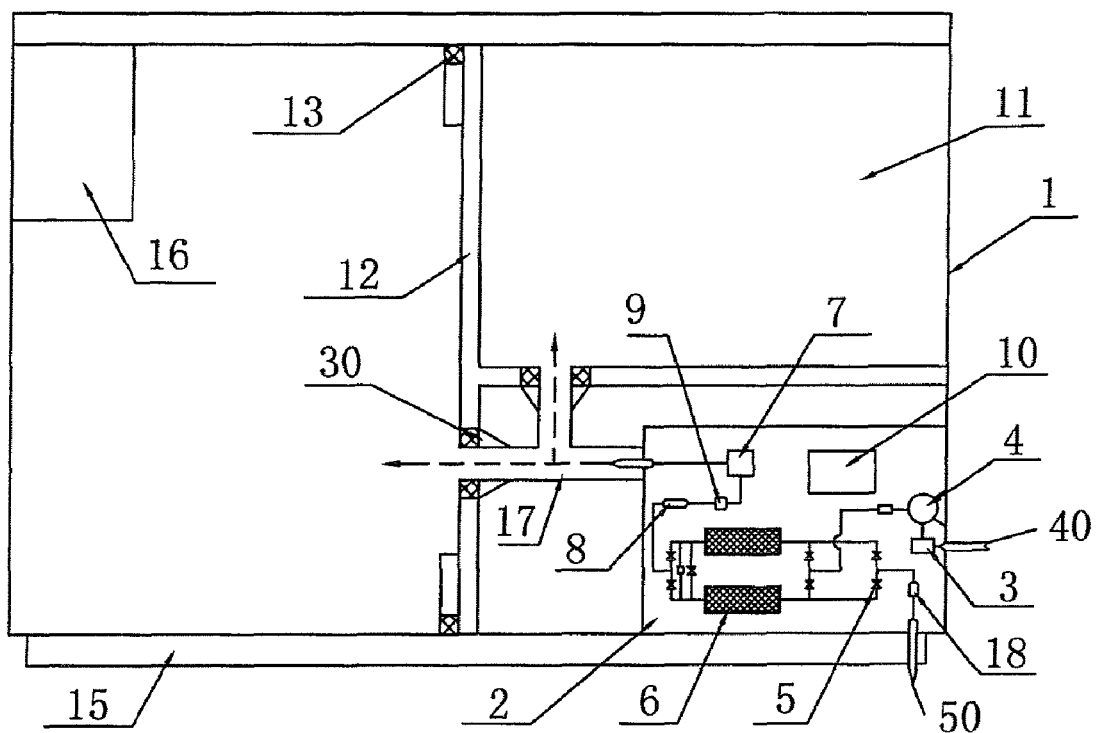
FIG. 2 is a structural view of a refrigeration and freezing device with fresh-keeping function by supplying nitrogen embodying as a refrigerating cabinet according to another embodiment of the present invention.
Figure 4:
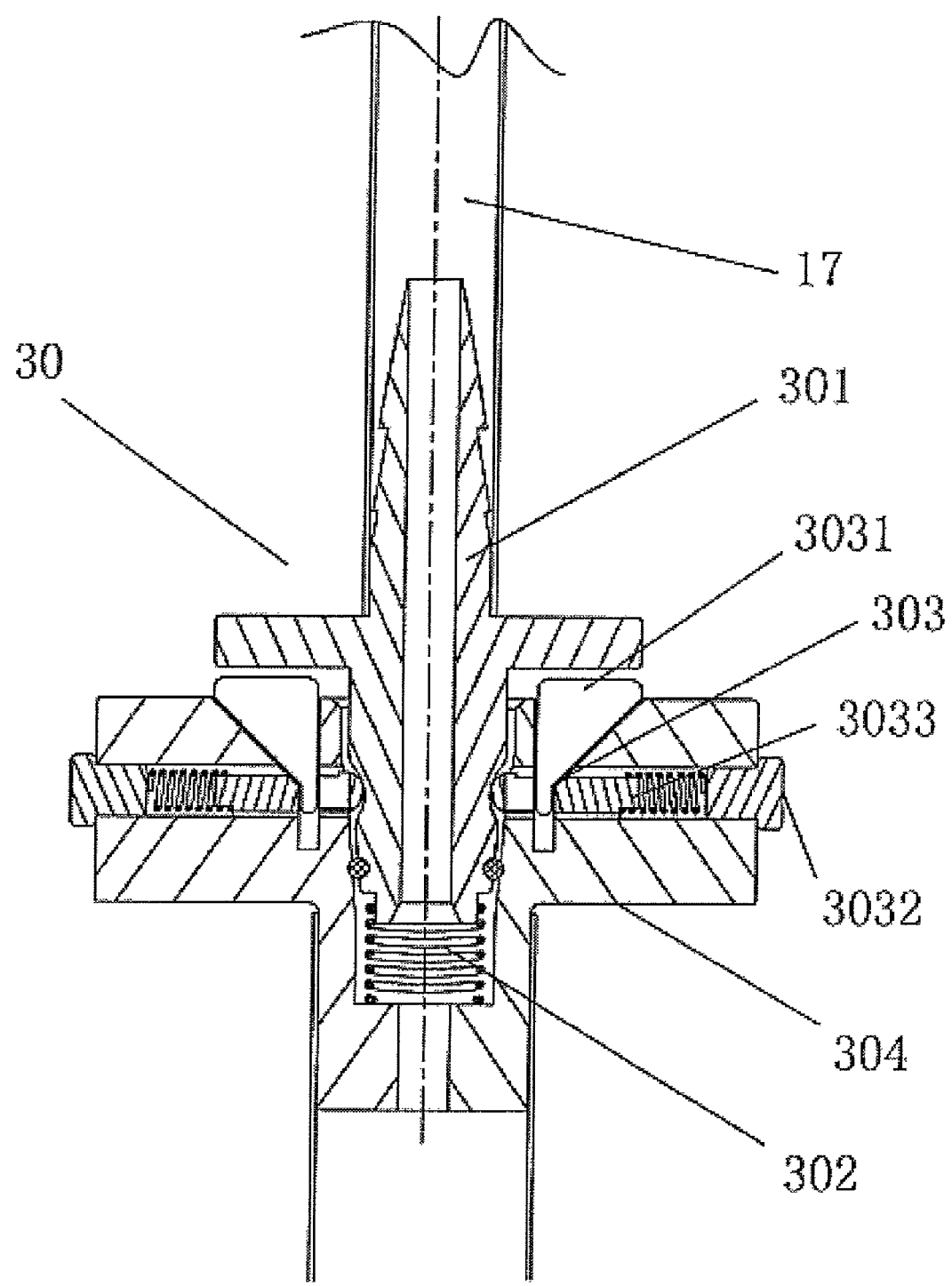
FIG. 4 is a structural view of a quick-connect device of the refrigeration and freezing device of the present invention.

As illustrated in FIGS. 1, 2 and 4, the refrigeration and freezing device 1 with fresh-keeping function by supplying nitrogen comprises a box body, a refrigerating and freezing chamber disposed inside the box body, a door to the refrigerating and freezing chamber, a control device 16 and a nitrogen generator 2; wherein said nitrogen generator 2 is disposed either inside or outside the box body of the refrigeration and freezing device 1; wherein an air inlet 40, an oxygen outlet 50 and a nitrogen outlet are disposed respectively on said nitrogen generator 2, said oxygen outlet 50 leads to the outside of said refrigeration and freezing device, said nitrogen outlet is connected with an inlet of the refrigerating and freezing chamber via a pipe 17, a quick-connect device 30 which can be easily inserted and drawn is disposed between said pipe 17 and said inlet of the refrigerating and freezing chamber; wherein a nitrogen concentration feedback device is disposed inside said refrigerating and freezing chamber, said nitrogen concentration feedback device is electrically connected with the control device 16 so as to control the operation of the nitrogen generator 2.

Wherein said refrigeration and freezing device 1 embodies as a refrigerator or a refrigerating cabinet.

Wherein said nitrogen generator 2 embodies as a molecular sieve nitrogen generator or a membrane separation nitrogen generator.

Wherein said nitrogen generator 2 further comprises an air filter 3 connected with the air inlet, a compressor 4, a pipe device for transmitting gas, at least one carbon molecular sieve absorber 6, at least one control valve 5 to control different absorbers to work alternately, a nitrogen storage container 8, a nitrogen purifier 7, a pressure reducing valve 9 for adjusting the pressure of the produced nitrogen, and a ventilating muffler 18 disposed on a pipe to the oxygen outlet; wherein said pipe device functions as a communicating passage enabling connection between parts, said control valve 5 is disposed on the upstream of the carbon molecular sieve absorber 6, said nitrogen storage container 8 and nitrogen purifier 7 are disposed respectively on the downstream of the carbon molecular sieve absorber 6; said nitrogen generator 2 further comprises a control circuit 10, and said control circuit 10 is electrically connected with the control device 16 of the refrigeration and freezing device.

Wherein said compressor 4 of the nitrogen generator embodies as an oil free compressor or a common compressor shared by the refrigerator or refrigerating cabinet.

Figure 3:
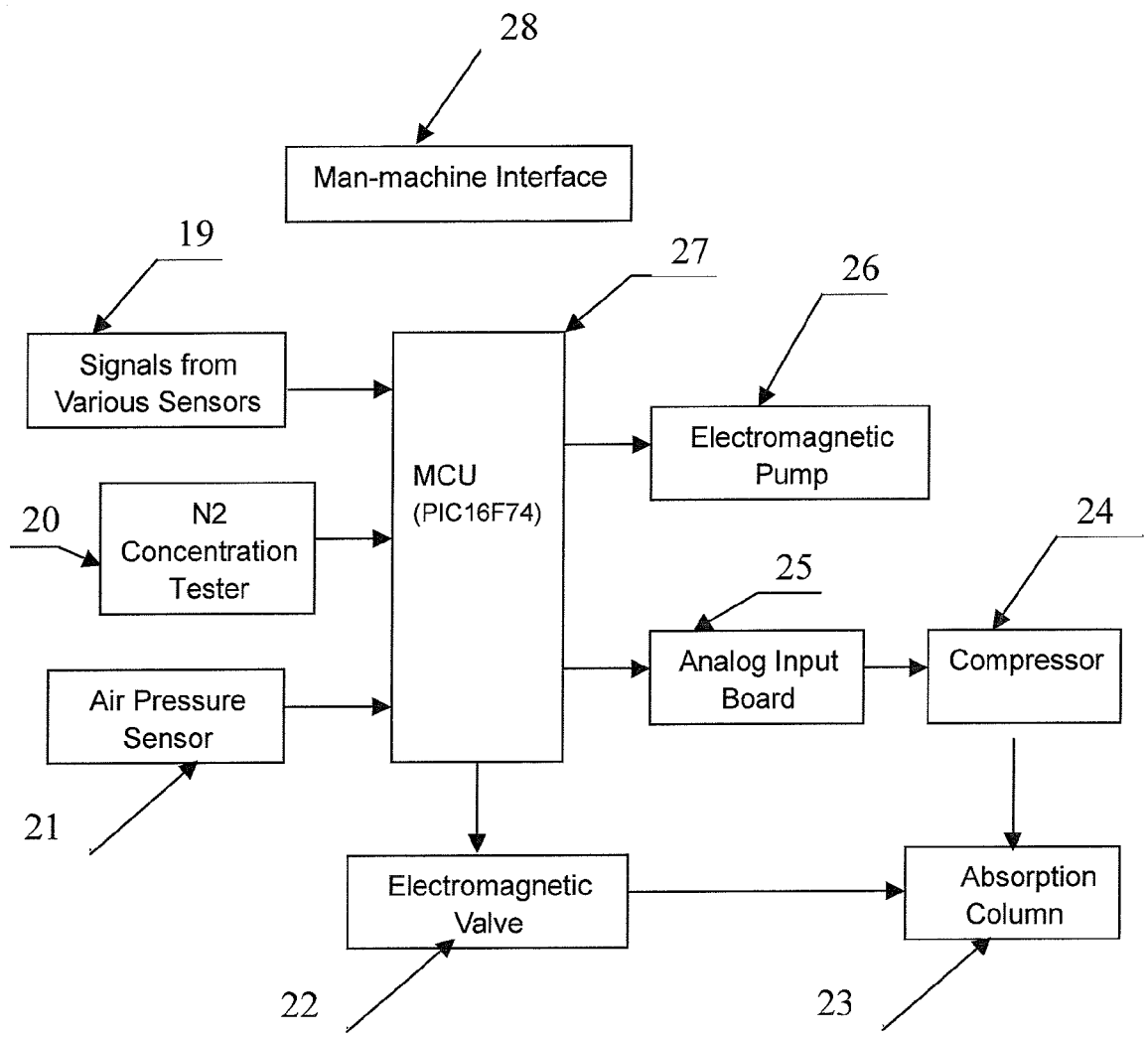
FIG. 3 is a schematic view of the electric control circuit of the refrigerator or refrigerating cabinet of the present invention.

As illustrated in FIG. 3, in the present invention, said refrigeration and freezing device is controlled by a control center, said control center is a Micro Controller Unit (MCU) or a Programmable Logic Controller (PLC); said control center is connected with a man-machine interface, various sensors, a N2 concentration tester, an electromagnetic valve, a compressor, an absorption column, and an analog input board; a user inputs instructions through the man-machine interface, which is then transmitted to the control center to be controlled.

Said control center is further connected with an electromagnetic pump 26 which vacuumizes the refrigerating and freezing chamber, an air inlet and an air outlet are disposed respectively on said electromagnetic pump 26, and an air inlet and an air outlet are disposed respectively in said refrigerating and freezing chamber, wherein said air inlet of the electromagnetic pump 26 is connected with the air outlet of the refrigerating and freezing chamber, the air outlet of the electromagnetic pump 26 leads to the outside of said refrigeration and freezing device.

The control center 27 inputs signals through various sensors 19 and starts nitrogen concentration tester 20 to test the fruit and vegetable preservation chamber, for example, when the nitrogen concentration in the chamber lower than a set value, the MCU or PLC will accordingly send signals to start the electromagnetic pump 26 to vacuumize the chamber, with pressure information transmitted by an air pressure sensor 21, then the electromagnetic pump 26 is cut-off when the chamber is vacuumized to a certain air pressure; the MCU or PLC controls the analog input board 25 so as to start the compressor 24 and the electromagnetic valve 22; the nitrogen into the absorption column 23 is absorbed and separated and then supplied to the fruit and vegetable preservation chamber, when the nitrogen is supplied up to a set value, the nitrogen concentration tester 20 sends signals so that the control center 27 gives instructions to cut-off the compressor 24 and the electromagnetic valve 22 stops nitrogen supply, the user's different requirements can be met by adjusting and setting working parameters through the man-machine interface 28; the model of said MCU can be PIC16F74.

The quick-connect device 30 as illustrated in FIG. 4 comprises a connecting device, an elastic element, a locating device and an installation seat; wherein one end of said connecting device is connected with the pipe 17, while the other end contacts with the elastic element which is disposed inside the installation seat to be fastened therein by means of the locating device; the installation seat is connected with the air inlet of said refrigerating and freezing chamber. One end of the connecting device 301 is connected with the pipe 17, while the other end contacts with a detach spring 302 which is disposed inside the installation seat 304 by means of the locating device, which forces the detach spring 302 to be compressed and reach a pre-set value; in order to fasten the connecting device 301 onto the installation seat 304 and ensure its quick connecting and detaching when use, the locating device 303 is combinably constructed by a wedge 3031, a locating pin 3032 and a restoring spring 3033, with a flute disposed at the joint between the connecting device 301 and the locating pin 3032. In user's normal use, the locating pin 3032 is compressed onto the flute of the connecting device 301 by the force from the restoring spring 3033, and the connecting device 301 is fastened on the installation seat 304; when there is a request for detachment, pull the pipe 17 upwardly which generates a pulling force in addition to the pre-set counterforce from the detach spring 302, the connecting device 301 is forced to move upwardly from the base of the installation seat 304 so as to push the locating pin 3032 to move outwardly with the help from the restoring spring 3033, once the locating pin 3032 detaches away from the flute of the connecting device 301, the connecting device 301 is accordingly detached away from the installation seat, thereby enabling the detachment between the pipe 17 and the refrigerator.

Said refrigerator or refrigerating cabinet may be domestic or commercial types.

Said mini PSA or membrane separation nitrogen generator can be connected with and supply nitrogen to one or more fruit and vegetable preservation chamber drawers independent from each other or other partitioned spaces 11 inside said refrigeration and freezing device; each of the fruit and vegetable preservation chamber drawers or other partitioned spaces 11 is partitioned away from each other by means of a partition board 12 or the like; the upper and lower fringes of the partition board 12 are sealed by means of a silica gel sealing strip 13 or the like; fruit and vegetable preservation chamber drawers are sealed with each other.

Said fruit and vegetable preservation chamber of the refrigerator or refrigerating cabinet can be made in way of drawers, or in way of doors with left and right doors opened independently, or upper and lower doors opened independently; as in way of drawers, the nitrogen inlet of the chamber is connected with the nitrogen outlet of the nitrogen generator by means of a quick sealing connector which can be easily taken out without leaking nitrogen out of the chamber; as in way of independent doors, every time when open and close the door, air in the chamber is automatically taken out and nitrogen is automatically supplied in; said fruit and vegetable preservation chamber drawers are provided with switches sensible for mechanical signals, electronic signals, sound wave signals, photoelectricity signals, temperature signals, pressure signals or magnetic signals, said switches can be triggered by any movement produced by said fruit and vegetable preservation chamber drawers, no matter in way of any door open or close or drawer movement, and said switches are electrically connected with the control device 16.

The production and supply of nitrogen is automatically controlled with information collected from various sensors; said various sensors are adopted to sense induced signals, sound wave signals or electric control signals which are produced by automatic detecting on the nitrogen concentration and other gases concentrations in air, or by automatic detecting on the pressure or temperature inside or outside the fruit and vegetable preservation chamber, or by detecting on the triggered signals from door open and close, movements of the fruit and vegetable preservation chamber or other objects, or by detecting on the photoelectricity induction from the light difference between door open and close, or by detecting on the magnetic induction from magnetic changes.

Said mini PSA or membrane separation nitrogen generator is disposed on the base frame or other positions of a refrigerator or a refrigerating cabinet so as to form integrally with the refrigerator or refrigerating cabinet.

The control device of said mini PSA or membrane separation nitrogen generator can be controlled manually instead of any automatic trigger control, including manual or programme control by computer or logic chip, or mechanical switch control.

Oxygen separated from said mini PSA or membrane separation nitrogen generator can be directly exhausted into the house room so as to add oxygen in room air.

The above descriptions and illustrations should not be construed as limiting the scope of the present invention, which is defined by the appended claims. Various modifications, alternative constructions and equivalents made by technicians of the field may be employed without departing from the true spirit and scope of the present invention.

What is claimed is:

1. A refrigeration and freezing device with fresh-keeping function by supplying nitrogen, comprising
a box body,
a refrigerating and freezing chamber disposed inside the box body,
a door to the refrigerating and freezing chamber,
a control device (16) and
a nitrogen generator (2);
wherein the nitrogen generator (2) is disposed either inside or outside the box body of the refrigeration and freezing device (1),
wherein the nitrogen generator (2) comprises an air inlet (40), an oxygen outlet (50), a nitrogen outlet, an air filter (3) connected with the air inlet (40), a compressor (4), a pipe device for transmitting gas, at least one carbon molecular sieve absorber (6), at least one control valve (5) to control different absorbers to work alternately, a nitrogen storage container (8), a nitrogen purifier (7), a pressure reducing valve (9) for adjusting the pressure of the produced nitrogen, a ventilating muffler (18) disposed on the pipe of the oxygen outlet and a control circuit (10);
wherein the oxygen outlet (50) leads to the outside of the refrigeration and freezing device, the nitrogen outlet is connected with an inlet of the refrigerating and freezing chamber by a pipe (17), a quick-connect device (30) which can be easily inserted and drawn is disposed between the pipe (17) and the inlet of the refrigerating and freezing chamber;
wherein a nitrogen concentration feedback device is disposed inside the refrigerating and freezing chamber, the nitrogen concentration feedback device is electrically connected with the control device (16) so as to control the operation of the nitrogen generator (2);
wherein the pipe device functions as a communicating passage enabling connection between parts, the control valve (5) is disposed on the upstream of the carbon molecular sieve absorber (6), the nitrogen storage container (8) and nitrogen purifier (7) are disposed respectively on the downstream of the carbon molecular sieve absorber (6);
wherein the control circuit (10) is electrically connected with the control device (16) of the refrigeration and freezing device; and
wherein the quick-connect device (30) comprises a connecting device, an elastic element, a locating device and an installation seat; one end of the connecting device is connected with the pipe (17), while the other end contacts with the elastic element which is disposed inside the installation seat to be fastened therein by means of the locating device; the installation seat is connected with the air inlet of the refrigerating and freezing chamber; one end of the connecting device (301) is connected with the pipe (17), while the other end contacts with a detach spring (302) which is disposed inside the installation seat (304) by means of the locating device, which forces the detach spring (302) to be compressed and reach a pre-set value; in order to fasten the connecting device (301) onto the installation seat (304) and ensure its quick connecting and detaching for usage, the locating device (303) comprising a wedge (3031), a locating pin (3032) and a restoring spring (3033), with a flute disposed at the joint between the connecting device (301) and the locating pin (3032).

2. The refrigeration and freezing device according to claim 1, wherein the refrigeration and freezing device (1) comprises a refrigerator or a refrigerating cabinet.

3. The refrigeration and freezing device according to claim 2, wherein the nitrogen generator (2) comprises a molecular sieve nitrogen generator or a membrane separation nitrogen generator.

4. The refrigeration and freezing device according to claim 1, wherein the nitrogen generator (2) embodies as a molecular sieve nitrogen generator or a membrane separation nitrogen generator.

5. The refrigeration and freezing device according to claim 1, wherein the compressor (4) of the nitrogen generator embodies as an oil free compressor or a common compressor shared by the refrigerator or refrigerating cabinet.

6. The refrigeration and freezing device according to claim 1, wherein the refrigeration and freezing device is controlled by a control center, the control center is a Micro Controller Unit (MCU) or a Programmable Logic Controller (PLC); the control center is connected with a man-machine interface, various sensors, a nitrogen concentration tester, an electromagnetic valve, a compressor, an absorption column, and an analog input board; wherein the man-machine interface enables a user to input instructions, which are then transmitted to the control center.

7. The refrigeration and freezing device according to claim 6, wherein the control center is further connected with an electromagnetic pump (26) which vacuumizes the refrigerating and freezing chamber, an air inlet and an air outlet are disposed respectively on the electromagnetic pump (26), and an air inlet and an air outlet are disposed respectively in the refrigerating and freezing chamber, the air inlet of the electromagnetic pump (26) is connected with the air outlet of the refrigerating and freezing chamber, the air outlet of the electromagnetic pump (26) leads to the outside of the refrigeration and freezing device.

8. The refrigeration and freezing device according to claim 7, wherein the control center (27) inputs signals through various sensors (19) and starts the nitrogen concentration tester (20) to test a fruit and vegetable preservation chamber,
wherein when the nitrogen concentration in the chamber is lower than a set value, the MCU or PLC will accordingly send signals to start the electromagnetic pump (26) to vacuumize the chamber, with pressure information transmitted by an air pressure sensor (21), then the electromagnetic pump (26) is cut-off when the chamber is vacuumized to a certain air pressure, (22.

9. The refrigeration and freezing device according to claim 1, wherein the mini PSA or membrane separation nitrogen generator is connected with and supply nitrogen to one or more fruit and vegetable preservation chamber drawers independent from each other or other partitioned spaces (11) inside the refrigeration and freezing device;
wherein each of the fruit and vegetable preservation chamber drawers or other partitioned spaces (11) is partitioned away from each other by means of a partition board (12) or the like;
wherein the upper and lower fringes of the partition board (12) are sealed by means of a sealing strip (13)
wherein fruit and vegetable preservation chamber drawers are sealed with each other;
wherein the fruit and vegetable preservation chamber drawers are provided with switches sensible for mechanical signals, electronic signals, sound wave signals, photoelectricity signals, temperature signals, pressure signals or magnetic signals, the switches can be triggered by any movement produced by the fruit and vegetable preservation chamber drawers, and the switches are electrically connected with the control device (16).

\* \* \* \* \*